2,938,002
Patented May 24, 1960

2,938,002

CATALYST MANUFACTURE

Carl D. Keith, Munster, Ind., and Henry Erickson, Park Forest, Edwin H. McGrew, Riverside, and David G. Braithwaite, Chicago, Ill.; said McGrew and said Braithwaite assignors to Nalco Chemical Company, Chicago, Ill., a corporation of Delaware, and said Keith and said Erickson assignors to Sinclair Refining Company, New York, N.Y., a corporation of Maine No Drawing. Filed Sept. 28, 1956, Ser. No. 612,892

4 Claims. (Cl. 252—464)

This invention is concerned with the manufacture of calcined extruded alumina-based catalysts containing a minor amount of a mixed metal catalytically-active component.

There have been many catalysts prepared for use in enhancing chemical reactions. This is particularly true in the field of petroleum processing where refiners employ tons of catalytic material in a single processing unit, for instance for desulfurizing petroleum hydrocarbons. The catalysts are frequently composed of a solid supporting base material which can contain a catalytically-active component which is usually one or more metals or metal-containing materials. Although the carrier base is sometimes considered as inert this is seldom the case and most often the desired catalytic properties are afforded through coaction of the base material and the promoting or active metal component. Alumina is widely employed as a catalyst base material.

When alumina is used it is generally in activated form, that is, it has been calcined to remove water combined chemically as an alumina hydrate. Various processing steps and their combinations have been proposed for manufacturing the alumina hydrate, impregnating the base material with the catalytic promoting component, drying, calcining, etc. Great attention has been given to the choice of promoting metal, chemical composition of the alumina base material and other factors, but less frequently catalyst manufacturers have been concerned with the physical state of the catalyst as correlated with the choice of promoting metal. The catalysts are generally employed in a reaction zone in particle form, for instance less than 200 mesh for fluid operations or as macrosize particles in fixed or moving bed processes. When using macrosize particles, the catalyst is subjected to large stresses from the weight of the catalyst disposed above a given particle in the lower portion of the bed. Thus, the macrosize catalyst particles must be physically strong. Generally, such particles range from about $\frac{1}{16}''$ to $\frac{1}{2}''$ in diameter and about $\frac{1}{16}''$ to $1''$ or more in length with particles of about equal length and diameter being preferred.

One method for providing strong macrosize particles is by making tablets from smaller catalyst particles as the manufacturer can to some degree regulate the strength of the product by varying the tabletting pressure. A difficulty associated with tabletting is that the resulting catalyst particles frequently are of low porosity due primarily to the pressure employed in shaping. Since catalytic efficiency can be a function of porosity due to the greater chemical activity exhibited when the feed to be reacted can enter the pores of the catalyst particles and the products obtained can exit the pores with ease, it is apparent that decreased porosity can lower the effectiveness of the catalyst. Thus, it is desirable to provide macrosize particles which are fairly strong and of satisfactory porosity.

One method for preparing macrosize porous alumina catalyst particles is by extrusion. In this procedure the catalyst material, e.g., small particle form alumina hydrate, in admixture with free water is forced through small holes to form continuous streams of extruded material which are broken or cut into shorter lengths approaching the individual stream diameter. The material extruded is sufficiently hard to assume a definite shape yet it must have enough free moisture so that it issues from the holes continuously and does not crumble and fall apart. Two types of extruders which have found substantial use are the barrel auger type such as that manufactured by Welding Engineers and the Sprout-Waldron pelleter.

Although extrusion tends to produce catalyst particles of greater porosity than afforded by tabletting, the extruded particles have been found to have tendencies towards physical weakness causing breakage. This is particularly true where low extrusion pressures are employed to provide particles of good porosity. In a processing unit, breakage is highly undesirable since the free space in the catalyst bed is decreased which increases the pressure drop on materials passing through the bed and may necessitate a shutdown of the processing unit. Weakness in the particles is due in part to cracks which occur as the result of extrusion but other and more deleterious cracks are formed during drying and calcination. Also, the strength of the catalyst particles can be affected by the choice of the promoting metal component.

We have conducted experiments with respect to the preparation through extrusion of alumina catalyst particles to obtain macrosize materials of satisfactory strength and porosity where the particles contain combinations of cobalt or nickel with molybdenum, vanadium or tungsten. In these studies we have found little correlation between handling techniques necessary to one processing scheme and those which are advantageous in a different method. For instance, the method of the present invention was developed to avoid difficulties in obtaining alumina catalyst base particles of satisfactory strength and porosity in a system where an aqueous slurry of alumina hydrate containing trihydrate is spray dried to form microspherical particles containing up to about 20 weight percent of free water. These microspheres generally have an average diameter within the range of about 20 to 125 microns. The microspheres are combined with the catalytically-active metals in the presence of an aqueous medium. The resulting wet alumina hydrate containing the promoting metal components and more than about 50 weight percent of free water is then dried to about 5 to 20 weight percent of free moisture by contact of dispersed hydrate particles with a heated gas. The dried material is reconstituted with water to an extrusion mixture, extruded, redried to less than about 5 weight percent of free moisture at a temperature of up to about 400° F. and calcined to provide the final catalyst of good activity, porosity and strength.

As stated, in our method the spray dried alumina hydrate microspheres are combined with the catalytically-active metals, and this operation can be accomplished by any desired procedure as long as an aqueous medium is added to raise the free water content of the resulting mixture to at least about 50 weight percent. The promoting metal components comprise minor amounts of one or both of cobalt or nickel and one or more of molybdenum, vanadium or tungsten. When adding the promoting metal components, the spray dried alumina hydrate can be mixed with aqueous solutions of water-soluble compounds of the catalytically-active metals so that the metal components are adsorbed on the base. Alternatively, the promoting materials can be precipitated on the alumina hydrate base through suitable reaction of an aqueous slurry of the base containing water-soluble acid salts of the promoting metals. Preferably, however, we mix within an essentially aqueous medium the spray dried alumina hydrate base with substantially water-insoluble compounds of the promoting metals whereby the insoluble metal constituents react with or are adsorbed on the base. Usually the mixing is continued for at least about ten minutes and at a temperature of about 125 to 210° F. Higher or lower temperatures can be employed if desired, for instance room temperature is effective. However, temperatures above the boiling point of water necessitate the use of superatmospheric pressures to maintain the liquid phase. The water-insoluble compounds are usually inorganic and in the form of oxides, hydroxides, carbonates, basic carbonates or sulfides.

The total amount of active metal components on the alumina can vary considerable while being sufficient to afford a substantial catalytic effect. In general, this amount is a minor proportion of the catalyst and may be as low as 0.1 weight percent of the finished catalyst. Usually the total active metal components can comprise from about 1 to 40 weight percent of the catalyst and each component is at least about 0.05 weight percent of the finished catalyst. All of these percentages are calculated as metal oxides.

In the method of the present invention the impregnated, wet alumina hydrate containing more than about 50 weight percent of free water, is dried by contact with a hot gas, for instance, as the hydrate particles fall by gravity through the drying zone. In this method of drying, the alumina hydrate falls more or less as discrete or dispersed particles, that is essentially without continuing physical contact with one another, even through the particles may make a number of separate falls in passing through the drying zone. If certain prior practices be followed in this operation the free water content of the product stream would be controlled so that enough water remained in the particle mixture to enable it to be passed directly to the extruder. Alternatively, the over-all water content of the product stream might be slightly less than that desired for extrusion so that better control would be effected by simple water addiiton. In any event, an operator would consider it unnecessary to dry materially beyond the free water content desired for extrusion since he would merely reconstitute the material for extrusion by subsequent water addition.

It was established that when using the dispersed hydrate particle-hot gas contact drying system in obtaining a product having an over-all water content at or slightly below that required for extrusion, the final catalyst particles were highly cracked and therefore weak. We have found that this undesirable cracking was due at least in part to the type of drying operation employed, that is, it was found that the product stream from the drier was a heterogeneous mixture of particles having substantially different amounts of free water associated therewith. When the heterogeneous product was extruded and then dried the wetter particles shrank more than the drier particles which resulted in a number of cracks in the final calcined catalysts.

Thus, in the present invention the porous macrosize catalyst particles, e.g., having at least about 0.3 cc./gram, and preferably at least about 0.4 cc./gram of pore volume as measured by the method of Barrett et al., JACS 73, 373 (1951), of satisfactory strength can be produced providing proper processing control is observed. In the drying of the impregnated, wet alumina hydrate before extrusion the hydrate particles are dispersed and contacted with the hot gas so that they contain from about 5 to 20 weight percent of free water, preferably from about 5 to 10 percent. Advantageously, the impregnated, wet hydrate is derived as a filter cake for charging to this drying operation. The dried particles are then reconstituted by water addition to an extrusion mixture usually containing about 30 to 50 weight percent free water. This mixture is then extruded to produce macrosize pellets of the desired diameter and length. In extruding such pellets it has been found to be desirable in order to effect proper consolidation of the particles which make up the pellets to carry out the extrusion in stages by passing the extruded pellets from the first extrusion mill directly into a second extrusion mill. This results in greater compression of the pellets and consequently higher strength. Any fines that are formed during the extrusion process are removed and recycled for reconstitution with the material which is supplied to the first extrusion mill. The macrosize extruded particles are then dried at a temperature of up to about 400° F. until they contain less than about 5 weight percent of free water and preferably less than about 1 percent. These pre-dried particles are calcined to produce the strong, porous, extruded macrosize alumina catalyst particles. When designating free water or free moisture content we refer to that measured by a Central Scientific Company infra-red moisture meter containing a 125 watt bulb, the meter being identified as catalogue No. 26675, or its equivalent.

The drying and calcination temperatures used in treating the impregnated alumina hydrate in the method of the present invention can vary widely. For instance, drying temperatures will usually range up to about 400° F., e.g., about 200 to 400° F., while calcination temperatures are from about 750 to 1300° F. or more. In the last drying of the hydrate before extrusion a flash drier can be employed in which dispersed hydrate particles fall through a hot gas but if enough free water be present this drying could be accomplished by spray drying to the designated free moisture content. When drying the alumina hydrate after extrusion, a convenient piece of equipment to employ is a louvered rotary drying drum having air entering the drum between the longitudinally disposed louvers. The calcination kiln is conveniently of the rotary type which is advantageous for continuous processing. However, unless the kiln has a low temperature preheat section the catalyst charged is immediately subjected to high temperatures which can reduce the particle strength. In spite of this, the rotary kiln has been found satisfactory for particles where the free moisture content of the charge is less than about 5 weight percent.

Among the known alumina hydrates are the monohydrate boehmite, another hydrate or hydrous alumina which appears to be amorphous; and the trihydrates, bayerite, gibbsite and randomite (bayerite-II). We employ alumina hydrate which contains about 10 to 90 weight percent of trihydrate, preferably less than about 50 weight percent, with substantially the remainder being monohydrate or amorphous or mixtures of these forms. When we characterize the various forms of alumina hydrates, we refer to their definition by X-ray diffraction techniques on samples dried at about 110 to 120° C. The alumina hydrate can contain minor amounts of other materials such as silica.

The alumina hydrate containing alumina trihydrate which is employed in the method of the present invention can be prepared by any procedure desired. For example, an aqueous solution of aluminum chloride or another acidic aluminum salt can be reacted with aqueous ammonium hydroxide to precipitate an essentially boehmite or amorphous alumina hydrate. This material can be washed to remove chloride and ammonium ions and as the concentrations of these electrolytes decrease the alumina hydrate will convert to trihydrate. This conversion can be stopped by drying the alumina material. This procedure thus affords a means whereby a trihydrate-containing material can be prepared. Alternatively, the alumina monohydrate or amorphous forms and the alumina trihydrate can be made in separate reaction systems and these hydrous phases can be blended to provide the desired trihydrate-containing material. An alumina hydrate base of multiple phases can be prepared by reacting a portion of an aqueous solution of sodium aluminate with carbon dioxide to provide the desired quantity of trihydrate and then reacting the remaining aluminate with an acid aluminum salt, such as sulfate, to afford the boehmite and hydrated amorphous portions of the alumina hydrate. Before using the alumina hydrate in the method of the present invention or after the spray drying operation, it can be water washed to remove impurities.

The following specific examples will serve to illustrate the practice of the present invention.

EXAMPLE I

An aqueous slurry having a concentration of about 6% alumina hydrate of which approximately 20% is alumina trihydrate is pumped with a high pressure pump into a spray drier and atomized at a pressure of 900 to 1000 pounds per square inch in an atomizer of hot air having an inlet temperature of 1000 to 1100° F. The particle temperature is approximately 260° F. and the resultant microspherical particles run approximately 50% by weight above 200 mesh and 50% by weight below 200 mesh. The dry material is collected for the next step of the process. This material contains about 10 to 15% of free water and about 25 to 30% of total water (free water plus water of crystallization).

1500 pounds (ignited weight basis) of the dried alumina hydrate microspherical particles prepared as above described are added to 527 gallons of water, heated to 180° F. and agitation is begun. 175 pounds of pure molybdic oxide is slurried in 15 to 20 gallons of water and added to the alumina hydrate-water mixture previously prepared. 107 pounds of cobalt carbonate are slurried with 15 to 20 gallons of water and added to the alumina hydrate-water mixture. Agitation of the slurry at a temperature of 180° F. is continued for one hour.

The resultant mixture is pumped to a filter and filtered as fast as possible, at the same time maintaining the filter cake as thick as possible. The filter cake is transferred into a flash drier where dispersed falling hydrate particles are contacted with a hot gas stream, the outlet temperature of which is maintained at 200 to 250° F. to produce a material containing about 25% of total water and about 5 to 10% of free water. The material is discharged from the flash drier into a hammer mill which grinds any hard particles. The dried impregnated material is passed to storage preparatory to using it in the next step of the process.

250 pounds of the dried impregnated material containing about 5 to 10% of free moisture is mixed in a blender with 17.2 gallons of water for about 10 to 20 minutes at about 60 to 80° F. The moisture content is adjusted to about 33% by weight of free $H_2O$ by adding a small amount of previously dried impregnated material or fines obtained from a previous extrusion.

The impregnated alumina hydrate containing about 33% by weight of free moisture is passed through a pellet extrusion mill to produce finished pellets approximately 1/8" in diameter and 1/8" to 1/4" long. The finished pellets are discharged directly into a second pellet mill designed to produce pellets having approximately the same size. This results in greater compression of the pellets and consequently higher strength. The material from the second pellet mill is discharged into a screener which removes the fines. The latter are recycled to the blender to be used in making up the mixture to be extruded. The pellets which now contain about 27 to 29% of free water are ready for drying, screening and calcining.

The extruded pellets are predried at a temperature of 250° F. until the free moisture content is reduced to less than 5% by weight. They are then screened again to remove fines which are recycled back to the blender. The screened pellets are fed directly into a calciner maintained at a temperature of 1050 to 1150° F. The calcined pellets are ready for use in catalytic operations.

These pellets have a bulk density of about 47 pounds per cubic foot, are blue in color, and have a hardness corresponding to a 15 pound crush (longitudinal) per 1/8" length. The amount of cobalt plus $MoO_3$ corresponds to about 11 to 12% of the resultant catalyst.

By the method of this example other catalysts can be prepared. For instance, the molybdic oxide could be replaced by 210 pounds of tungstic acid ($WO_3.H_2O$) while the cobalt carbonate is omitted in favor of 100 pounds of nickel carbonate. Alternatively, the nickel carbonate could be substituted as described for the cobalt carbonate with 216 pounds of vanadium pentoxide being added in place of the molybdic oxide.

EXAMPLE II

The catalyst containing cobalt and molybdenum described in Example I is used for desulfurization of oil by bringing the oil in contact with the catalyst at a temperature of 580 to 780° F. depending upon the stock and degree of desulfurization desired, at pressure ranges from 200 to 800 pounds per square inch, at hydrogen recycle ranges from 500 to 5000 standard cubic feet per barrel of feed and at space velocities varying from 1 to 8 depending upon the stock processed. The following tables give the results obtained with four different types of stock.

*Table I*

| Type Operation | Desulfurization | |
|---|---|---|
| Stock Processed | Straight Run Naphtha | Blend Virgin and Vis-broken Naphtha |
| Processing Conditions: | | |
| Temperature, ° F | 700 | 700 |
| Pressure, p.s.i.g | 250 | 700 |
| Weight Hour Space Velocity | 6 | 5 |
| Hydrogen Recycle, s.c.f./b | 800 | 3500 |
| Hydrogen Consumption, s.c.f./b | 10 | 170 |

| | Feed | Product | Feed | Product |
|---|---|---|---|---|
| Inspection Tests: | | | | |
| Gravity, °API | 55.0 | 55.3 | 50.0 | 51.0 |
| Sulfur, Wt. Percent | 0.062 | 0.001 | 0.31 | 0.001 |
| Bromine Number | 1.2 | 0.2 | 15.9 | 0.1 |
| Nitrogen, Wt. Percent | 0.001 | 0.000 | 0.006 | 0.000 |
| Color, Saybolt (NPA) | 30+ | 30+ | −10 | 30+ |
| Arsenic, p.p.b | | 4 | 10 | 4 |
| Lead, p.p.b | | | 100 | 3 |

*Table II*

| Type Operation | Desulfurization | |
|---|---|---|
| Stock Processed | Virgin Heating Oil | Fluid Cycle Oil |
| Processing Conditions: | | |
| Temperature, ° F | 700 | 700 |
| Pressure, p.s.i.g | 500 | 500 |
| Weight Hour Space Velocity | 3 | 2 |
| Hydrogen Recycle s.c.f./b | 2000 | 3000 |
| Hydrogen Consumption, s.c.f./b | 110 | 180 |

| | Feed | Product | Feed | Product |
|---|---|---|---|---|
| Inspection Tests: | | | | |
| Gravity, ° API | 37.4 | 38.8 | 25.9 | 29.2 |
| Sulfur, Wt. Percent | 0.80 | 0.05 | 1.80 | 0.08 |
| Bromine Number | 7.0 | 1.0 | 23.8 | 8.1 |
| Nitrogen, weight Percent | 0.015 | 0.007 | 0.030 | 0.015 |
| Color, Saybolt (NPA) | (1½) | (1½) | (1½) | (2) |
| Arsenic, p.p.b | | | | |
| Lead, p.p.b | | | | |

The invention is hereby claimed as follows:

1. In a method of preparing a porous alumina catalyst material, the steps comprising spray drying an aqueous slurry of alumina hydrate to obtain microspherical particles containing up to about 20% free water, said hydrate containing about 10 to 90% of alumina trihydrate, adding to the spray dried microspheres in the presence of an aqueous medium a minor amount of a plurality of metal components comprising (1) a catalytically-active promoter containing a member selected from the group consisting of cobalt and nickel and (2) a member selected from the group consisting of molybdenum, vanadium and tungsten to obtain an impregnated alumina hydrate containing at least about 50% of free water, drying the wet alumina hydrate particles to about 5 to 20% of free water by contacting dispersed alumina hydrate particles with a heated gas, reconstituting the dried alumina hydrate particles to an extrusion mix by incorporation of water so that the mix contains about 30 to 50% of free water, extruding the reconstituted mixture to obtain macrosize alumina hydrate particles, drying the extruded particles to less than about 5% of free water at a temperature of up to about 400° F., and calcining the dried macrosize particles, said metal components being added as compounds of the metals, and the total active metal components of the resultant catalyst being at least 0.1 weight percent of the catalyst and not more than 40 weight percent, each metal component being at least 0.05 weight percent, calculated as the metal oxides.

2. The method of claim 1 in which the catalytically active component contains cobalt and molybdenum.

3. The method of claim 1 where the said metal components are added as water insoluble compounds.

4. In a method of preparing a porous metal alumina catalyst material, the steps comprising spray drying an aqueous slurry of alumina hydrate to obtain microspherical particles containing up to about 20% free water, said hydrate containing about 10% to about 90% of alumina trihydrate, adding to the spray dried microspheres in an aqueous medium a minor amount of cobalt carbonate and molybdic oxide to obtain an impregnated alumina hydrate containing at least about 50% free water, said addition of cobalt carbonate and molybdic oxide being carried out with mixing in an aqueous medium at a temperature within the range of 125° F. to 210° F., flash drying the impregnated wet alumina hydrate particles to about 5% to about 20% of free water in a heated gas stream, reconstituting the dried impregnated alumina hydrate particles to an extrusion mix by incorporation of water so that the mix contains from about 30% to about 50% of free water, extruding the reconstituted mixture to obtain macrosized impregnated alumina hydrate particles, drying the extruded particles to less than about 5% of free water at a temperature of up to about 400° F., and calcining the dried macrosized particles, said cobalt carbonate and said molybdic oxide constituting at least 0.1 weight percent and not more than 40 weight percent of the catalyst, and each being at least 0.05 weight percent of the catalyst.

References Cited in the file of this patent
UNITED STATES PATENTS

| | | |
|---|---|---|
| 2,340,935 | Connolly | Feb. 8, 1944 |
| 2,391,358 | Spicer et al. | Dec. 18, 1945 |
| 2,492,808 | Marisic et al. | Dec. 27, 1949 |
| 2,574,355 | Smith | Nov. 5, 1951 |
| 2,692,259 | Peters | Oct. 19, 1954 |
| 2,748,062 | Doumani | May 29, 1956 |
| 2,831,652 | Gemperle | Apr. 22, 1958 |

UNITED STATES PATENT OFFICE

CERTIFICATE OF CORRECTION

Patent No. 2,938,002                                             May 24, 1960

Carl D. Keith et al.

It is hereby certified that error appears in the printed specification of the above numbered patent requiring correction and that the said Letters Patent should read as corrected below.

Column 3, line 31, for "through" read -- though --; line 40, for "addiiton" read -- addition --; column 5, line 14, for "dier" read -- drier --.

Signed and sealed this 10th day of January 1961.

(SEAL)
Attest:
KARL H. AXLINE
Attesting Officer

ROBERT C. WATSON
Commissioner of Patents